Figure 19:
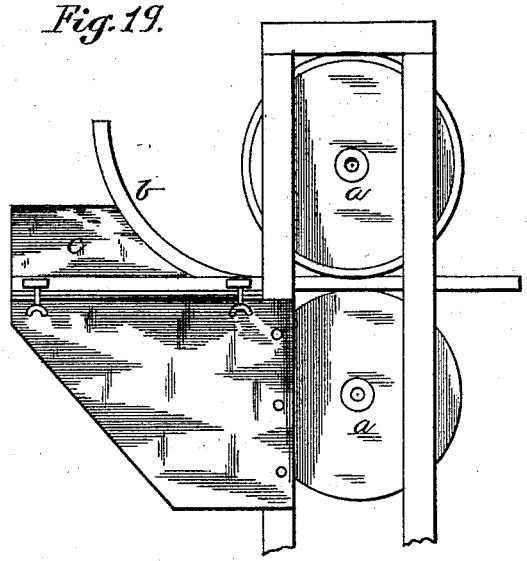

(No Model.) 3 Sheets—Sheet 1.
B. LUDWIG.
MACHINE FOR BENDING WOOD.
No. 417,056. Patented Dec. 10, 1889.
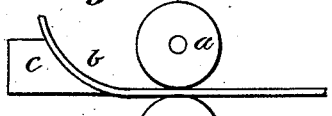
Fig. 10.
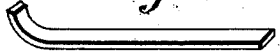
Fig. 1.
Fig. 3.
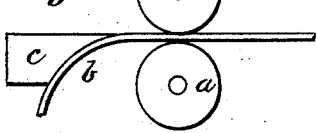
Fig. 11.
Fig. 2. Fig. 4.
Fig. 13.
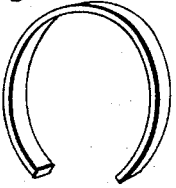
Fig. 5. Fig. 6.
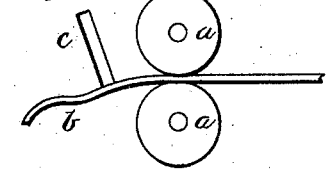
Fig. 15.
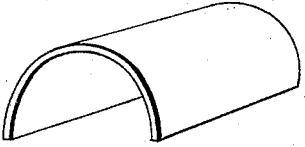
Fig. 7.
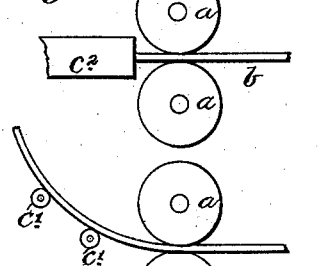
Fig. 17.
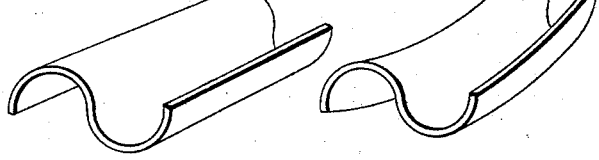
Fig. 8. Fig. 9.
Fig. 18.
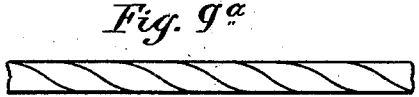
Fig. 9ª.
WITNESSES_
Albert. B. Blackwood
Wm Clabaugh
INVENTOR_
Bernhard Ludwig
By Connolly Bros
Attys (No Model.) 3 Sheets—Sheet 2.

B. LUDWIG.
MACHINE FOR BENDING WOOD.

No. 417,056. Patented Dec. 10, 1889.

WITNESSES.
Albert B. Blackwood
W. M. Clabaugh

INVENTOR.
Bernhard Ludwig
By Connolly Bros.
Attys (No Model.)  3 Sheets—Sheet 3.
B. LUDWIG.
MACHINE FOR BENDING WOOD.
No. 417,056. Patented Dec. 10, 1889.
Fig. 23. Fig. 24. Fig. 12.
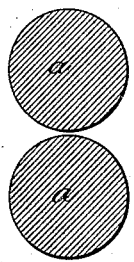 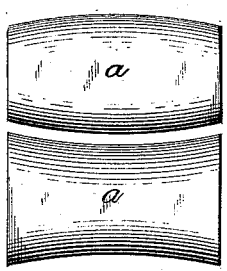 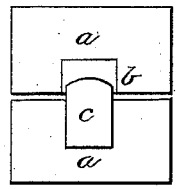
Fig. 25. Fig. 26. Fig. 14.
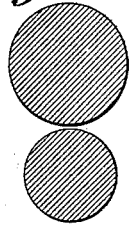 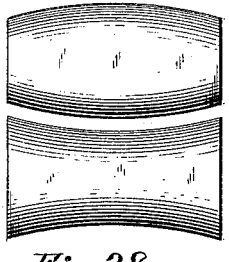 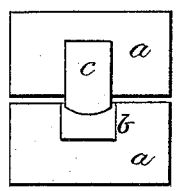
Fig. 27. Fig. 28. Fig. 16.
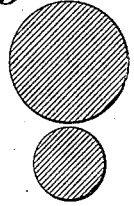 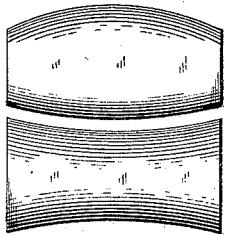 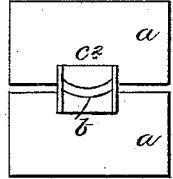
Fig. 29. Fig. 30.
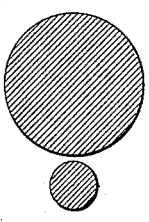 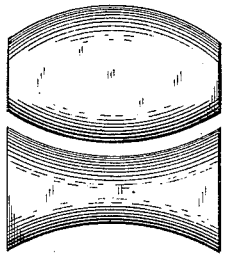
Fig. 31.
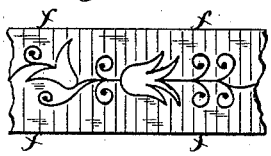
WITNESSES                INVENTOR
Albert B. Blackwood      Bernhard Ludwig
Wm Clabaugh              By Connolly Bros
                              Attys

UNITED STATES PATENT OFFICE.

BERNHARD LUDWIG, OF VIENNA, AUSTRIA-HUNGARY.

MACHINE FOR BENDING WOOD.

SPECIFICATION forming part of Letters Patent No. 417,056, dated December 10, 1889.

Application filed March 12, 1888. Serial No. 267,065. (No model.)

*To all whom it may concern:*

Be it known that I, BERNHARD LUDWIG, a subject of the Emperor of Austria, and a resident of the city of Vienna, in Austria, have invented certain new and useful Improvements in Bending Wood to Permanent Curvature, of which the following is a specification.

My invention has relation to apparatus for bending wood to permanent curvatures; and it consists in the novel construction and combinations of devices hereinafter described and claimed.

Heretofore wood was bent to permanent curvature in the following manner, viz: It was first treated with boiling water or steam, then the desired curvature was imparted to it, and finally the wood thus bent was allowed to dry slowly while it was held fast in suitable molds or otherwise. This well-known method requires much time and labor.

According to the present invention I am enabled to impart to dry wood within a few minutes any desired and permanent curvature. For this purpose I employ one or more pairs of heated rollers, in combination with particular guiding devices. The dry wood to be bent may be in the shape of boards, plates, strips, or bars. It is introduced between the heated slowly-revolving rollers, and meets, on emerging from between the rollers, particular suitably-shaped guiding devices, whereby the permanent bending of the wood into any desired form is effected, as will be hereinafter more fully described. The treatment of the dry wood by the heated rollers softens it for a short time, (about a minute,) and thus imparts to it a certain degree of plasticity, enabling me to give to the wood any desired curvature by means of particular devices. On cooling, which takes place very rapidly, the wood again becomes rigid, keeping completely the curved or bent shape, which has been given to it by the operation of the said guiding devices. Thus, for instance, it is even possible to bend a straight flat strip or bar of dry wood within a few minutes into the shape of a ring without breaking or otherwise injuring the wood, such ring then retaining its shape unaltered.

Figure 21:
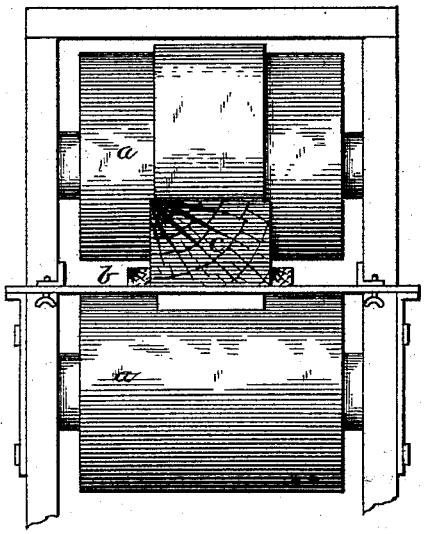
Figure 22:
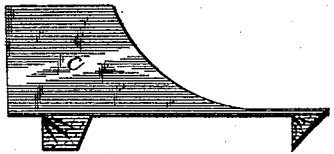

In the accompanying drawings, Figure 1 to 9, inclusive, are perspective views showing different curvatures of wood. Fig. 9$^a$ is a side view of a piece of bent wood of spiral form. Figs. 10, 11, 13, 15, 17, 18, and 19 are side views of a portion of the bending apparatus, showing the heated bending-rolls and the guides with a piece of wood in the process of treatment. Figs. 12, 14, and 16 are detail views showing the bending-rolls in side elevation with the guides arranged in proper relation thereto. Fig. 20 is a horizontal sectional view of the bending-machine. Fig. 21 is an end view of the same. Fig. 22 is a vertical longitudinal section of one form of guide. Figs. 23, 25, 27, and 29 are transverse sectional views of the bending-rolls. Figs. 24, 26, 28, and 30 are side views of the same. Fig. 31 is a plan view of a piece of decorated wood.

The dry wood $b$ inserted between the heated rollers $a$ $a$ is compressed by the latter and fed onward in the direction indicated by the arrow. By the action of the heat of the rollers the wood is rendered flexible and plastic, so that when by a guiding device $c$ or $c'$ or $c^2$ an obstacle is placed in the way of the direction in which the wood would otherwise advance, the latter is bent according to the position or shape of the said obstacle. Thereby it is possible to impart to the wood the curvatures indicated in Figs. 1 to 9$^a$. The guides may be in the shape of supports $c$, Figs. 10 to 15 and Figs. 19 to 21, or rollers $c'$, Fig. 18, or molds $c^2$, Figs. 16 and 17. The guide may be so arranged that the bend is directed upward, Figs. 10, 13, and 18, or downward, Fig. 11, or alternately upward and downward, or only laterally, Figs. 16 and 17.

Figure 20:
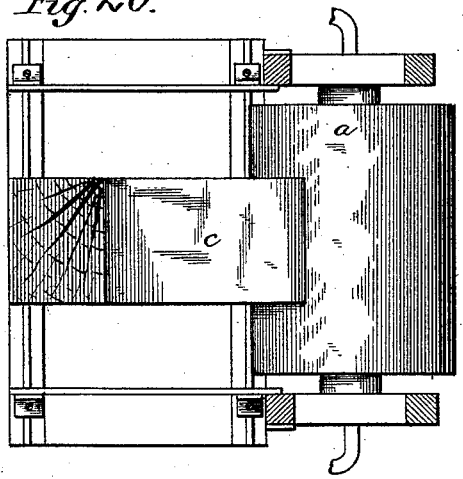

Figs. 19 to 21 show in detail and in various views the arrangement of a guide-block $c$ for the purpose described.

The guiding devices may be adjustable, so that more or less sharp bends may be produced in the wood as may be desired. Of course the heated rollers may be adjustable toward or from each other.

If it is desired to give the wood a very sharp bend, it is advisable to employ a series of pairs of heated rollers of gradually-increasing curvature of outline, as shown as an example in Figs. 23 to 30; or the wood may be caused to pass again between the same heated rollers.

When it is desired to produce a spirally-wound rod, Fig. 9ª, from a straight one, the rod emerging from between the heated rollers is rotated round its own axis by means of tongs. The wood being flexible and plastic only for a very short time after leaving the rollers, only those parts which come out from between the rollers and are still hot can be bent into the form desired, and the wood becomes rigid again very soon when it has moved away a little from the rollers and has cooled down. Therefore the wood may, if desired, be partly bent and partly remain straight.

When boards or bands or fillets of considerable thickness have to be bent, as hereinbefore described, it is advisable to heat them beforehand, so that the wood is already heated in its mass before it enters between the rollers, because with thick wood the heat given off by the rollers has not time to penetrate into the interior of the wood.

The rollers $a\ a$ may be heated in any desired way. I prefer, however, to heat them from their interior by the aid of gas-burners, and I prefer to heat them to such a temperature as to just slightly char the wood.

Sometimes I combine with the method for bending wood, hereinbefore described, a method for decorating the same by providing the rollers with suitable engravings, whereby designs or ornaments are partly pressed and partly charred into the wood. By this method I am enabled to produce from a dry, straight, and smooth board within a few minutes, for instance, a curved chair-back provided with various light and dark brown ornaments. When this method is employed for decorating wood, it is advisable to provide the rollers with grooves or flutings parallel to their axis in order to produce a better grip upon the wood, whereby the ornaments are much improved in appearance. Fig. 31 shows a plate of wood thus produced from which afterward those parts are cut away in which the ribs or projections $f$ produced by the flutings in the rollers appear.

I claim—

1. In a machine for permanently bending dry wood, a pair of hollow rollers heated from within, in combination with an inclined guide at the side where the wood leaves the said heated rollers, substantially as described and shown.

2. In a machine for permanently bending dry wood, a pair of hollow rollers heated from within and provided with longitudinal grooves to prevent the wood under treatment from slipping, and in combination with an inclined guide at the side where the wood leaves the heated rollers, substantially as described and shown.

In testimony whereof I have affixed my signature in presence of two witnesses.

BERNHARD LUDWIG.

Witnesses:
C. O. PAGET,
E. G. F. MOELLER.